Aug. 24, 1926.  1,596,879
H. M. JENKINS
MACHINE FOR FORMING SPHERICAL BODIES
Filed April 14, 1924   3 Sheets-Sheet 1
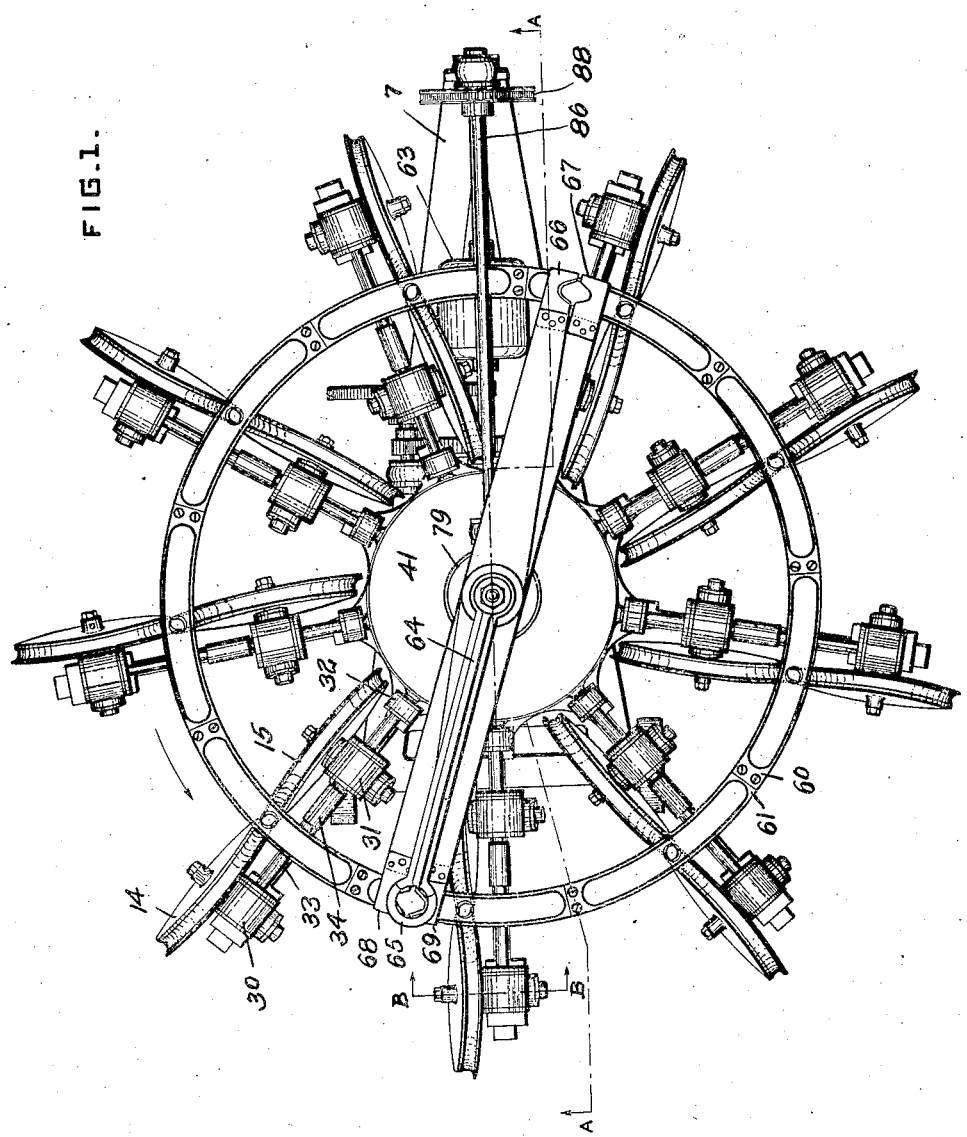
INVENTOR
Howard M. Jenkins.

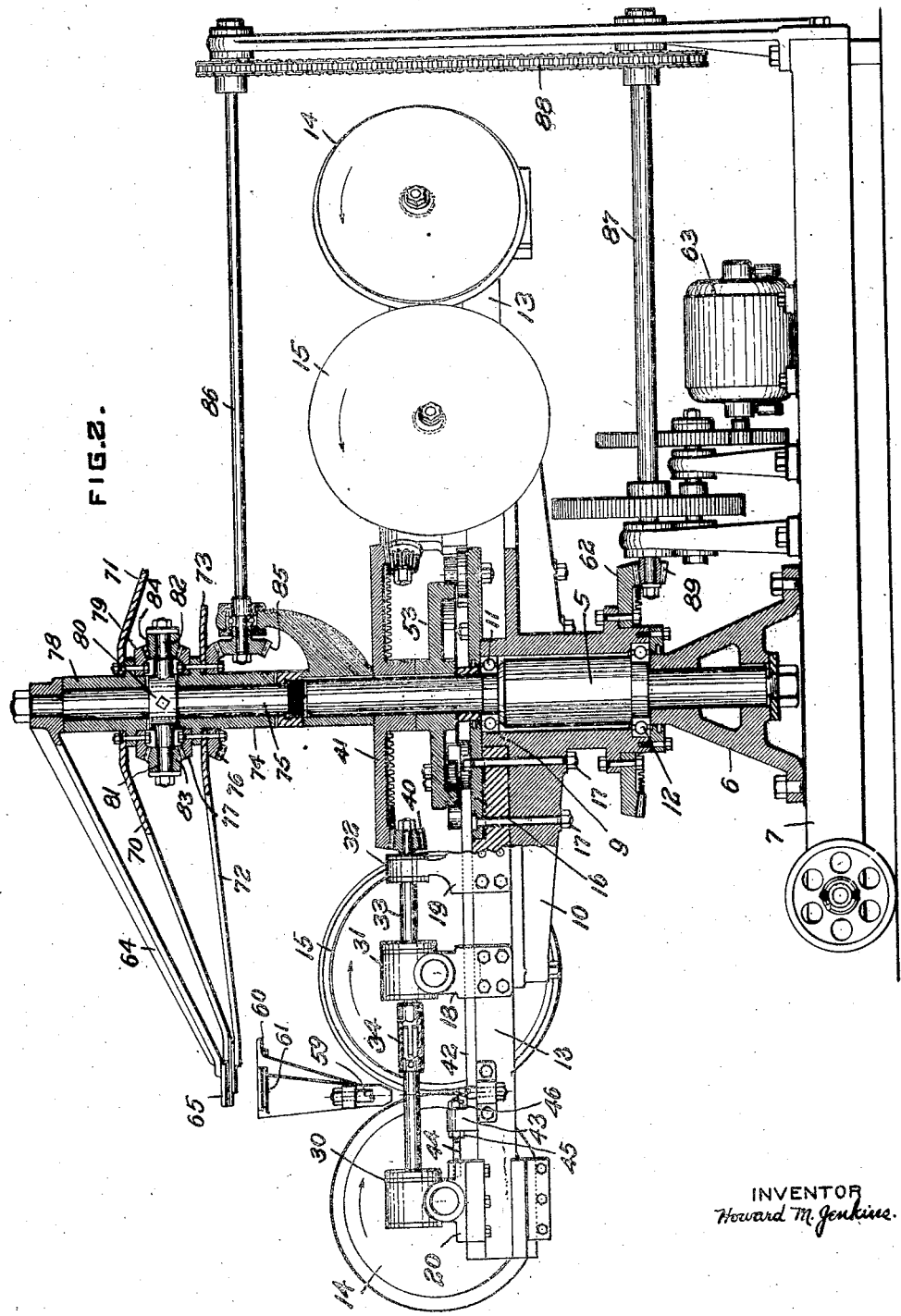

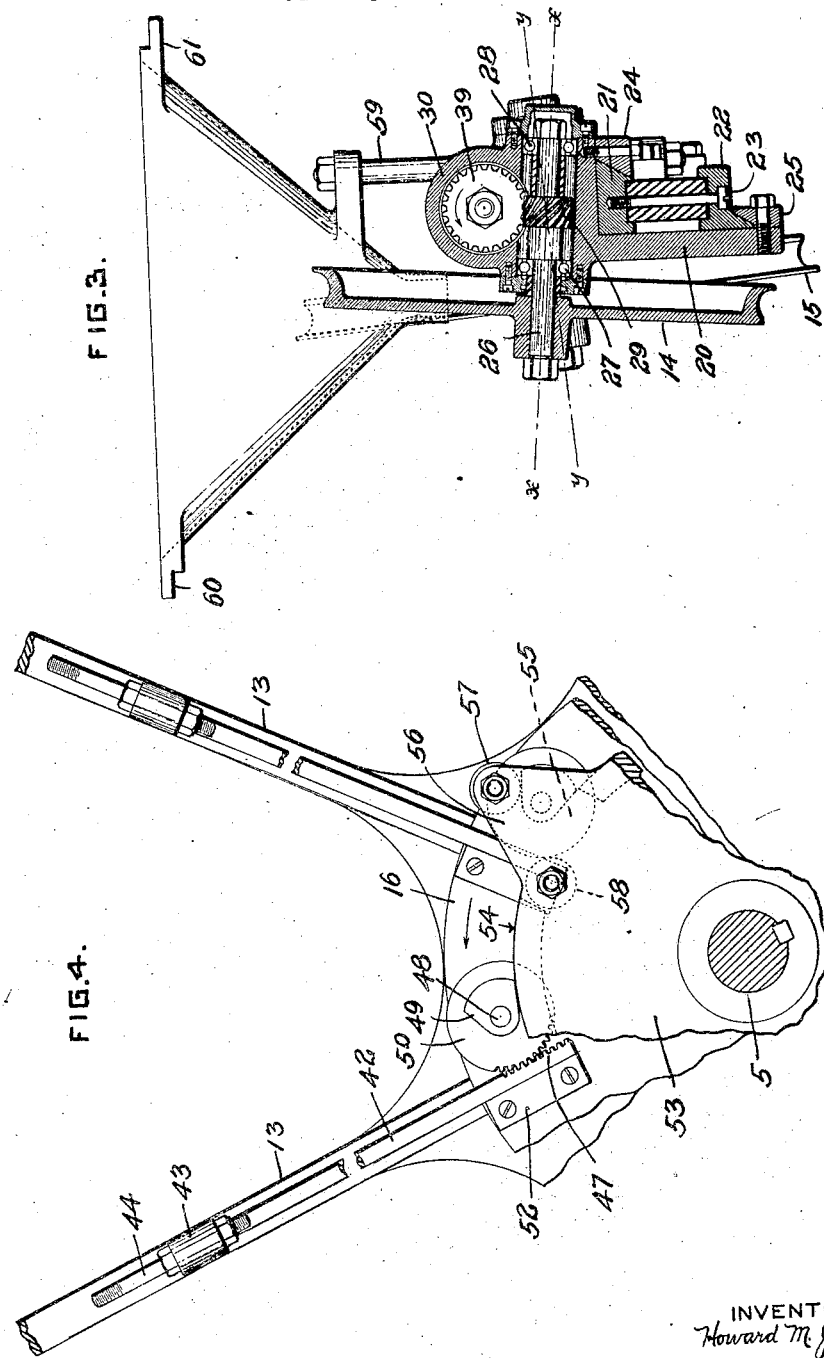

Patented Aug. 24, 1926.

1,596,879

UNITED STATES PATENT OFFICE.

HOWARD M. JENKINS, OF CLARKSBURG, WEST VIRGINIA.

MACHINE FOR FORMING SPHERICAL BODIES.

Application filed April 14, 1924. Serial No. 706,570.

This invention relates to machines for molding or otherwise forming spherical bodies and an object of this invention is to produce an improved machine embodying the principle of operation of the machine of Patent Number 1,488,817, issued to me on April 1, 1924; a machine of greater capacity and higher efficiency than the machine of said patent.

A further object is to produce a machine embodying the principle of operation of the machine of said patent which may be operated in conjunction with a glass feeder adapted to deliver uniform gobs of glass at regular intervals of time.

These as well as other objects which will be apparent to those skilled in this particular art I attain by means of the machine described in the specification and illustrated in the drawings accompanying and forming a part of this application.

In the drawings Figure 1 is a top plan view of a machine embodying this invention. Fig. 2 is a vertical section taken on the line A—A of Fig. 1, looking in the direction of the arrows. In this view some of the sets of forming wheels have been omitted for the purpose of avoiding confusion. Fig. 3 is a sectional view taken on the line B—B of Fig. 1, looking in the direction of the arrows; and, Fig. 4 is an enlarged detail view of a portion of the mechanism for discharging the finished articles from the machine.

Since the present machine is particularly adapted for forming marbles from molten glass, the material to be acted on will be referred to as glass and the finished articles as marbles without, however, restricting the invention to the use of glass or the formation of marbles.

The machine is a multiple unit machine in which the units are identical one with the other. For the purpose of this application I have chosen a nine unit machine; more or less units, of course, can be employed, if desired.

In a general way the machine comprises nine sets of rotating peripherally grooved forming wheels. The wheels of each set have their axes angularly disposed one to the other and the sets of wheels are mounted in spaced relation around a central column or standard.

The wheels of each set rotate in the same direction but at different peripheral speeds. This is accomplished by making the wheels of each set of different diameter. The periphery of one wheel at the forming point moves upwardly while that of the other wheel moves downwardly. The peripheral speed of the wheel moving upwardly at the forming point is greater than that of the wheel moving downwardly at that point and because of this gob of glass being acted upon by the wheels is maintained at the forming point and prevented from falling through between the wheels.

The sets of wheels are mounted on radially extending arms or supports and these arms and therefore the sets of wheels are caused to move in succession past a glass receiving station.

Each support arm for the rotating wheels carries an arc-shaped funnel for receiving the glass at the glass receiving station and for conducting it to molding position between the wheels carried by the support arm. The gob of glass slides or falls to position between the wheels and is sustained in position or at the molding point as explained.

By the time each set of forming wheels approaches the glass receiving station the marble being molded thereby is finished and is sufficiently cooled and hardened to be delivered or discharged from the machine. At this point one of the wheels of the set is moved away from the other and the finished marble discharged. The wheel is immediately moved back so as to be in position when the glass receiving station is reached.

The central standard or post 5 of the machine about which the sets of forming wheels are caused to revolve is mounted within a base member 6. This member is bolted to the bed 7 of a truck or movable platform.

A support or table 9 provided with radially extending arms 10 is mounted for rotation about the central column or post 5 by means of annular ball bearings 11 and 12.

Each arm 10 carries an extension support arm 13 and a set of forming wheels comprising an outer wheel 14 and an inner wheel 15 is carried upon each of these extension support arms.

A circular plate or table 16 is bolted to radial arms 10 of table 9 by means of bolts 17 which are also used to secure the extension support arm 13 to the radial arms 10.

Each arm 13 carries two rigid brackets 18 and 19 bolted thereto and in addition a bracket 20 which is so mounted as to be capable of limited reciprocation longitudinally on arm 13.

Arm 13 adjacent its bracket 20 has guide blocks 21 and 22 (Fig. 3) secured thereto by means of bolts 23 which pass upwardly through the arm. The bracket is gibbed to the guide blocks by means of gibs 24 and 25.

Spindle 26 of forming wheel 14 is journaled within annular ball bearings 27 and 28 secured within a housing portion of bracket 20. Between bearings 27 and 28 the spindle carries a spiral gear 29.

Stationary bracket 18 of each extension arm 13 is provided with a housing portion similar to that shown in Fig. 3 for spindle 26 and gear 29, and this carries annular ball bearings similar to those shown in Fig. 3 and within these the spindle for forming wheel 15 is journaled.

The axes of forming wheels 14 and 15 are inclined to the horizontal but in opposite directions, as shown in Fig. 3 in which the axis of forming wheel 14 is indicated by line X—X while that of forming wheel 15 is indicated by line Y—Y.

While the axes of the forming wheels are angularly disposed one to the other, they are perpendicular or 90° to the longitudinal axis of extension arm 13.

Brackets 20, 18 and 19 are provided with upwardly extending portions respectively numbered 30, 31 and 32 and within these an extensible pinion shaft 33 is journaled. The shaft 33 is provided with a slip joint 34 which is constructed so as to allow the shaft to be extended and collapsed during rotation thereof. Shaft 33 carries a spiral gear 39 which is housed within bracket extension 30. This gear meshes spiral gear 29 on spindle 26. A spiral gear, not shown and which is housed within bracket extension 31 meshes with a spiral gear carried on the spindle of forming wheel 15. The inner end of shaft 33 carries a pinion 40 that meshes with a stationary crown gear 41 keyed to central post 5.

It will be understood that each extension arm 13 carries brackets similar to those illustrated in Fig. 2 and that an extensible pinion shaft similar to shaft 33 is provided for each extension arm.

A rack bar 42 is mounted to slide on the top surface of each support arm 13, and through a recess in brackets 18 and 19, and at its outer end each bar is provided with an upwardly extending foot 43. This foot is drilled in order to accommodate a through bolt 44 which is threaded into bracket 20. Adjustment nuts 45 and 46 are provided for adjusting the position of rack bar 42 with relation to bracket 20.

The inner end of rack bar 42 is provided with rack teeth 47. Plate 16 adjacent the inner end of each support arm 13 is drilled to receive a stud 48 and upon each of these studs a combined cam 49 and segmental gear 50 is mounted. The cam and gear are preferably formed from a single piece of metal. The thrust upon each rack occasioned by its gear is resisted by means of a backing plate 52 secured to support plate 16.

Keyed to central post 5 below crown gear 41 is a cam operating member 53. This member is provided with a concentric bearing face 54 having an interruption as shown by dotted lines at 55 Fig. 4. The plate is provided with an extension 56 upon the under side of which a contact roller 57 is mounted. The interruption 55 occurs immediately inside of roller 57 so that when one of the cams 49 contacts with roller 57 it will have room to swing inwardly about its stud 48. This movement of the cam will cause the rack bar with which its segmental gear meshes to move outwardly along its support arm 13 carrying with it bracket 20 and forming wheel 14.

A contact roller 58 shown by dotted lines Fig. 4 is so positioned at one end of the interruption of bearing surface 54 as to swing the cam leaving roller 57 back to normal position where it will ride along bearing surface 54. This latter movement of the cam moves forming wheel 14 back into normal operating position.

An annular series of arc-shaped funnels is positioned above the forming wheels for leading the gobs of molten glass to forming position between the wheels. The funnels are separately formed, and each is supported from one of the extension arms 13 by means of a supporting rod 59. The upper portions of the funnels are arranged in overlapping relation, and their ends 60 and 61 are formed for that purpose.

Table 9, near its bottom, carries a crown gear 62, and this, through means of suitable gearing, is connected with an electric motor 63.

For the purpose of severing the gathers of glass when hand gathering is employed, I provide suitable automatic shears. The shear blades are supported from the upper portion of central standard 5, and, rotating in opposite directions, are arranged to meet at the glass receiving station below a positioning ring 65. This ring is supported by an arm 64 to the top of standard 5.

For the purpose of giving the gatherer more leeway as to time, when hand gathering is employed, I provide two sets of shear blades, and these are arranged so that both sets will come into operation or operative position during the time that each funnel is passing below positioning ring 65. The blades of one pair of shears are numbered 66 and 67, while those of the other pair are numbered 68 and 69. The lower shear blades are carried on arms 72 and 73. Shear arms 72 and 73 are secured to a tubular support 74 journaled on part 75 of standard 5. Tubular support 74 also carries a lower crown gear 76 and an upper crown gear 77. Upper shear arms 70 and 71 are carried on a tubular support 78, and this support also carries a crown gear 79. Secured to portion 75 of standard 5, between tubular supports 74 and 78, is a ring 80, from the opposite sides of which trunnions 81 and 82 extend. These trunnions carry pinions 83 and 84 that mesh with crown gears 77 and 79. A pinion 85 meshes with crown gear 76, and the shaft 86, carrying pinion 85, is connected to a shaft 87 by means of sprockets and chain 88. Shaft 87 carries a pinion 89, which forms a part of the gearing between crown gear 62 and motor 63. Since pinions 83 and 84 are stationary, it will be apparent that the upper shear arms will rotate in the opposite direction from the lower shear arms, and at the same speed.

It will be apparent that, if the machine is used in connection with an automatic gob feeder, the shear mechanism may be omitted, since most automatic feeders are provided with their own shear mechanism. If hand gathering is used, this shear mechanism may also be omitted and the ordinary air-operated shears now in common use employed.

From Figures 1 and 3, it will be seen that instead of using the same form of peripheral groove in the forming wheels, as shown in my said Patent No. 1,488,817, I have changed the form of these grooves so that the wall of the groove on the outside of the forming wheels is higher than the wall on the inside. I find that this does away with the tendency of the material being molded to assume an elliptical form, and also overcomes the tendency to form trunnion-like projections on the spherical bodies. This tendency I have found to exist with the form of groove of said patent.

Having thus described my invention, what I claim as new, and desire to secure by Letters Patent, is:—

1. In a machine for making spherical bodies, multiple pairs of rotating, grooved, co-operating, forming members, means for causing said pairs to move in succession past a receiving station and means for separating the members of each pair to discharge finished material therefrom and for returning the members to working position thereafter.

2. In a machine for making spherical bodies, multiple pairs of rotating, grooved, co-operating, forming members, a supporting structure, means for causing said pairs to move in succession around said structure, and means for automatically separating the members of each pair to discharge finished articles therefrom and for returning the same to working position thereafter.

3. In a machine for making spherical bodies, multiple pairs of rotating, grooved, co-operating, forming members, a supporting structure, means for causing said pairs to move in succession around said structure, movable means for guiding material to position between the members of each pair, and means for causing the members of each pair to periodically separate for the discharge of finished articles and thereafter to move to working position.

4. In a machine for making spherical bodies, a number of pairs of rotating, peripherally grooved, co-operating, forming members, of which the members of each pair have different peripheral speeds and axes angularly disposed one to the other, means for causing said pairs to move in succession past a glass receiving station, and means for causing the members of each pair to periodically separate for the dicharge of finished articles and thereafter to move to working position.

5. In a machine for making spherical bodies, a number of pairs of rotating, peripherally grooved, co-operating, forming members, of which the members of each pair have different peripheral speeds and axes angularly disposed one to the other, a central support, means for causing said pairs to revolve about said support and means for separating the members of each pair to discharge finished articles and for moving the same thereafter to working position.

6. In a machine for making spherical bodies, a number of pairs of rotating, peripherally grooved, co-operating, forming members, of which the members of each pair have different peripheral speeds and axes angularly disposed one to the other, means for causing said pairs to move in succession past a glass receiving station, and means for separating the members of each pair, to discharge finished articles therefrom.

7. In a machine for making spherical bodies, a number of pairs of rotating, peripherally grooved, co-operating, forming members, of which the members of each pair have different peripheral speeds and axes angularly disposed one to the other, a central support, means for causing said pairs to revolve around said support, and means for separating the members of each pair, to discharge finished articles therefrom.

8. In a machine for making spherical bodies, a number of pairs of rotating, peripherally grooved, co-operating, forming members, of which the members of each pair have different peripheral speeds and axes angularly disposed one to the other, means for causing said pairs to move in succession past a glass receiving station, and means for causing the members of each pair to separate prior to reaching said station and thereafter return to working position.

9. In a machine for making spherical bodies, multiple pairs of rotating, peripherally grooved, co-operating, forming wheels, of which the wheels of each pair have different peripheral speeds and axes angularly disposed one to the other, means for causing said pairs to move in succession past a glass receiving station, means for separating the wheels of each pair at a predetermined point before reaching said station and for returning them to working position thereafter, and means movable with said wheels for guiding material to forming position therebetween.

10. In a machine for making spherical bodies, a central support, a number of pairs of peripherally grooved, co-operating, forming wheels carried by said support, means for rotating said wheels, means for causing said wheels to travel about said support, and means for separating each pair of wheels at a predetermined point in its travel and for returning them to working position thereafter.

11. In a machine for molding spherical bodies from molten glass, a number of pairs of rotating, peripherally grooved, co-operating forming wheels, of which the wheels of each pair have different peripheral speeds and axes angularly disposed one to the other, a standard concentrically arranged with relation to said wheels, means for causing said pairs of wheels to revolve about said standard, means for leading molten glass to forming position between said wheels, and means for separating the wheels of each pair at a pre-determined point in their travel about said standard and for returning them to working position thereafter.

In testimony whereof, I have hereunto subscribed my name this fifth day of April, 1924.

HOWARD M. JENKINS.